(12) United States Patent
Keefer et al.

(10) Patent No.: US 8,752,568 B2
(45) Date of Patent: Jun. 17, 2014

(54) LOW MASS DRAW AND RETURN TUBE ASSEMBLY AND PROCESS OF MANUFACTURING THE SAME

(76) Inventors: Neal L. Keefer, Portland, OR (US); Kenneth A. Watson, Vancouver, WA (US)

( * ) Notice: Subject to any disclaimer, the term of this patent is extended or adjusted under 35 U.S.C. 154(b) by 1508 days.

(21) Appl. No.: 11/652,787

(22) Filed: Jan. 11, 2007

(65) Prior Publication Data

US 2007/0157454 A1 Jul. 12, 2007

Related U.S. Application Data

(60) Provisional application No. 60/758,472, filed on Jan. 12, 2006.

(51) Int. Cl.
*F17C 13/00* (2006.01)

(52) U.S. Cl.
USPC ......... 137/15.08; 137/351; 137/592; 123/469

(58) Field of Classification Search
USPC .............. 137/590, 15.08, 563, 580, 351, 588, 137/592; 123/468, 469
See application file for complete search history.

(56) References Cited

U.S. PATENT DOCUMENTS

| | | | | |
|---|---|---|---|---|
| 3,291,184 A | * | 12/1966 | Varvel | 431/121 |
| 4,563,328 A | * | 1/1986 | Steinke | 376/446 |
| 4,651,701 A | * | 3/1987 | Weaver | 123/509 |
| 4,915,130 A | * | 4/1990 | Dowler | 137/579 |
| 5,249,594 A | * | 10/1993 | Kizer | 137/15.08 |
| 5,873,348 A | * | 2/1999 | Fuchs et al. | 123/514 |
| 6,102,445 A | * | 8/2000 | Thomas | 285/139.1 |
| 6,161,562 A | * | 12/2000 | Keefer et al. | 137/15.08 |
| 6,273,118 B1 | * | 8/2001 | Watson | 137/15.08 |
| 6,273,123 B1 | * | 8/2001 | Keefer et al. | 137/351 |

* cited by examiner

*Primary Examiner* — William McCalister
(74) *Attorney, Agent, or Firm* — Ingrid McTaggart

(57) ABSTRACT

A low mass draw and return tube assembly, for use in fuel tanks, is disclosed.

20 Claims, 2 Drawing Sheets

LOW MASS DRAW AND RETURN TUBE ASSEMBLY AND PROCESS OF MANUFACTURING THE SAME

This application claims priority on the U.S. provisional patent application filed on Jan. 11, 2006, assigned application No. 60/758,472, in the name of inventor Neal L. Keefer, and entitled LOW-MASS FUEL DRAW AND RETURN TUBE ASSEMBLY.

TECHNICAL FIELD

The present invention relates to a low mass draw and return tube assembly, and a process of manufacturing the same, for use in commercial vehicles, and more particularly, to a low mass draw and return tube assembly for use in commercial vehicles wherein the draw and return tubes are manufactured of a smaller diameter than adapter tubes that are welded to the flange.

BACKGROUND OF THE INVENTION

The present invention is particularly intended for use on commercial vehicles, although it may be used with any internal combustion engine connected to a fuel tank having a draw and return tube assembly. In particular, diesel engines typically operate by drawing fuel from a fuel tank, combusting a portion of the fuel and then returning the unused, or uncombusted, fuel to the fuel tank. The volume of fuel returned to the fuel tank is dependent on engine power output, and generally is quite substantial. Accordingly, such draw and return tube assemblies play a vital role in the operation of diesel engines.

Heavy commercial vehicles frequently employ dual fuel tanks, also called saddle tanks, wherein fuel is drawn simultaneously from both tanks for combustion within the engine. To prevent uneven draw and return of the fuel, which may lead to air being drawn into the engine, fuel flow regulators, such as draw and return tube assemblies, typically are installed in each of the dual fuel tanks.

One prior art draw and return tube assembly comprises draw and return tubes connected to a flange at one end of the tubes. The flange typically is mounted at an aperture sized to receive the flange on an outside surface of the fuel tank such that the opposite end of each of the draw and return tubes extends downwardly into fuel held within the lower portion of the tank. Draw and return lines from the engine are connected to the draw and return tubes at the flange, outside the tank.

The tube end openings inside the tank and opposite the flange typically extend away from one another and are each positioned an equal distance from the flange so that the draw and return tube fuel openings are also each positioned an equal distance below the top surface of fuel held within the tank. In this arrangement, when the two saddle tanks and the corresponding draw and return tube assemblies are each positioned on the commercial vehicle, the pressure head of fuel positioned above the draw and return tube openings of each assembly will result in equal amounts of fuel being withdraw from each of the tanks and equal amounts of fuel being returned to each of the tanks. In addition, swedging or crimping of the end of the return tube opening opposite the flange will facilitate filling the return fuel line. This filling of the return fuel line enables a siphon effect between the left and right hand fuel tanks. Accordingly, the draw and return tube assemblies of the prior art act as passive flow regulators for ensuring equal levels of fuel drawn and returned to each of the two saddle fuel tanks.

Conventional draw and return tubes may be extruded and then machined to enlarge their size or change their shape, whereafter the machined tubes are welded directly to the flange. The weld site at the flange may experience stress and related damage during bumpy movements of the truck along a road due to the large mass of material located remote from the flange, i.e., due to the long fuel tubes extending from the flange. A fuel tube having a relatively large thickness may be required in such prior art designs so as to withstand stress during welding to the flange and so as to withstand stress at the flange/tube connection during bumpy movement of the truck along a road. The large mass of material used to manufacture the thick draw and return tubes may contribute to high manufacturing costs of prior art assemblies.

Accordingly, there is a need for a draw and return tube assembly that may reduce stress on the flange and may be manufactured at a less expensive cost.

SUMMARY OF THE INVENTION

The present invention provides a low mass draw and return tube assembly, and a process of manufacturing the same, that overcomes the disadvantages of the prior art. One aspect of the present invention provides a low mass draw and return tube assembly wherein adapter tubes are secured to a flange and draw and return tubes are secured to the adapter tubes. This allows the draw and return tubes to be manufactured of a size smaller than, and utilizing less material per unit length than, the adapter tubes. Accordingly, the assembly may experience reduced strain on the flange during use because more material may be utilized in the adapter tubes at the flange connection site, and may be manufactured at a lower cost than prior art designs due to the use of less material along the length of the fuel tubes.

DETAILED DESCRIPTION OF THE PREFERRED EMBODIMENTS

The invention discloses a draw and return tube assembly that is intended for use on commercial vehicles, although it may be used with any internal combustion engine connected to a fuel tank utilizing a draw and return tube assembly.

Figure 1:
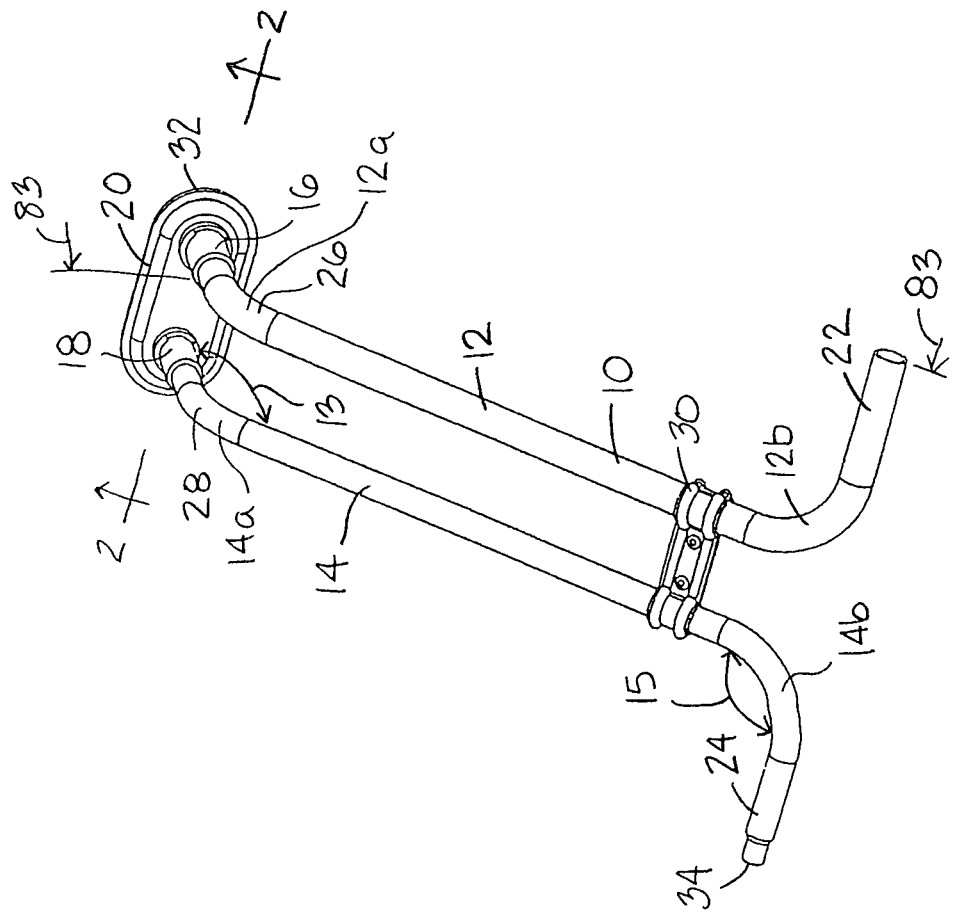
FIG. 1 is an isometric view of one example embodiment of a low mass draw and return tube assembly.

FIG. 1 shows a draw and return tube assembly 10 including a draw fuel tube 12, a return fuel tube 14, a draw adapter tube 16, a return adapter tube 18, and a base, or a flange 20, to which the adapter tubes 16, 18 are welded. In other embodiments, the adapter tubes may be brazed, soldered, or the like to flange 20. Each of the fuel tubes 12, 14 has a first end 22 and 24, respectively, positioned opposite the flange 20 and a second end 26 and 28, respectively, welded to adapter tubes 16, 18, respectively. In other embodiments, the fuel tubes may be brazed, soldered, or the like to adapter tubes. The first ends of the fuel tubes 22, 24, may be secured together by a bracket 30 to stabilize assembly 10 during bouncy or bumpy movements of a vehicle (not shown) in which the assembly 10 is mounted.

Still referring to FIG. 1, flange 20 may be oval in shape and may be welded around its edge 32 to the edge (not shown) of a flange receiving aperture (not shown) of a fuel tank (not shown) wherein the flange receiving aperture of the fuel tank may have an oval shape of a size slightly smaller than the size of flange 20. Flange 20 may be secured to the fuel tank so as to define an airtight seal therebetween, completely around edge 32 of the flange.

Return tube 14 may be crimped or swedged at an opening 34 of first end region 24, as known in the art. This swedging or crimping of the end of the return tube will facilitate filling of the return fuel line 14 thereby enabling a siphon effect between the left and right fuel tanks. Those skilled in the art will understand, of course, that the flange 20 and the tubes 12, 14 of the present invention may be manufactured in any size or shape as may be utilized for a particular use. In the preferred embodiment, tubes 12, 14, 16 and 18, and flange 20 are manufactured of aluminum. Any suitable material may be used, however, including other metals and any suitable man made materials such as plastics.

The fuel tubes 12, 14 may extend parallel to each other from flange 20 and to a first bend region 12a, 14a of the tubes, wherein the bend may define an angle 13 of approximately one hundred and seventy five degrees. Angle 13 may be in the range of one hundred and fifty degrees to two hundred and ten degrees, or any other angle as is desired. Fuel tubes 12, 14 may also include a second bend 12b, 14b, respectively, having an angle 15 of approximately ninety degrees.

Figure 2:
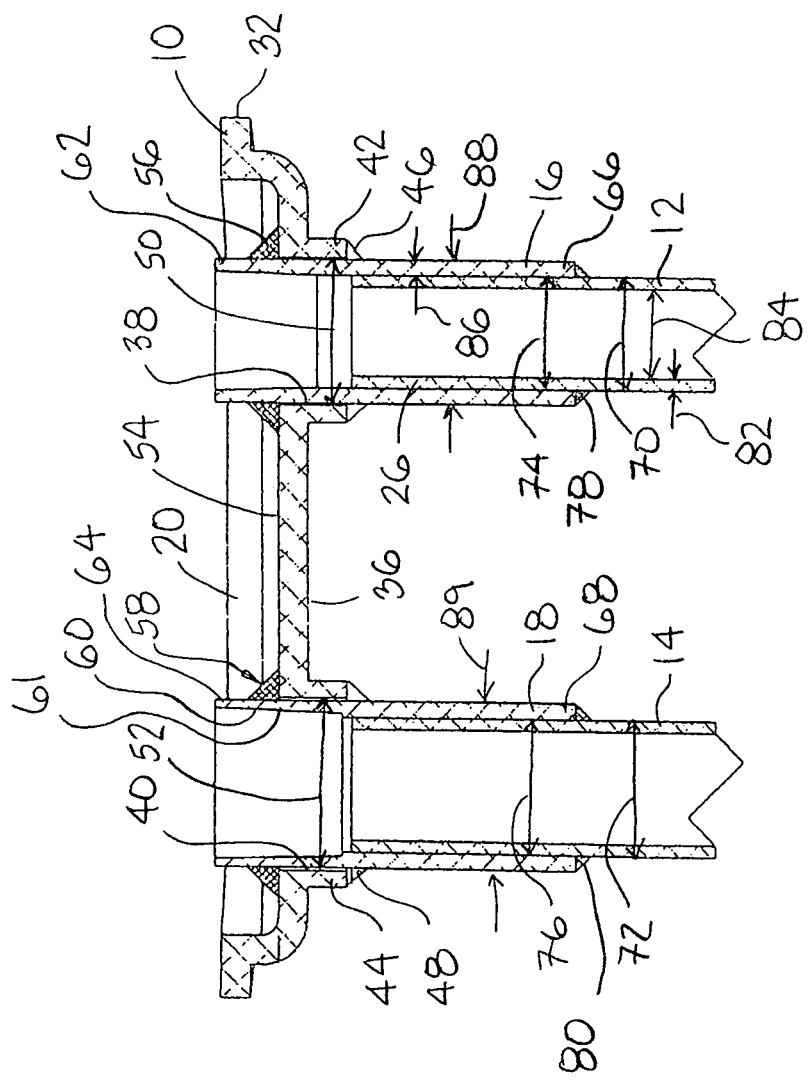
FIG. 2 is a cross-sectional side view taken along line 2-2 of FIG. 1.

FIG. 2 shows a cross sectional side view of the draw and return tube assembly 10 of FIG. 1. Flange 20 includes a generally oval shaped outer edge 32, an upper surface 36, and apertures 38 and 40, extending therethrough. Apertures 38 and 40 are sized and positioned with respect to each other so as to receive therein each of adapter tubes 16 and 18. Flange 20 may be configured to receive other tank components such as tank vents or fuel sending units (not shown), thereby further integrating and simplifying manufacture of the fuel tank (not shown).

Still referring to FIG. 2, apertures 38 and 40 may each include a raised lip 42 and 44, respectively, extending outwardly from surface 36 for facilitating placement of adapter tubes 16 and 18 therethrough, and for welding of the adapter tubes thereto at a weld site 46 and 48, respectively. Welds 46 and 48 are each positioned on an upper surface of raised lips 42 and 44, respectively. In the preferred embodiment aperture 38 has a diameter 50 and aperture 40 has a diameter 52. These diameters 50, 52 correspond to the outer diameters 88, 89 of the adapter tubes 16, 18 secured therein. As can be seen in FIG. 1, apertures 38 and 40 may be different sizes, such that the outer diameter of the corresponding adapter tubes 16, 18 secured therein may also be of different sizes with respect to one another. Such different sized apertures and tube diameters may be utilized as may be desired for particular flow requirements of the vehicle engine in which assembly 10 is installed.

Adapter tubes 16 and 18 may first be secured to upper surface 36 of the flange with welds 46 and 48 which are used to hold the adapter tubes in place during the finishing welding step wherein the adapter tubes 16, 18 are welded around their outer diameter to an interior, lower surface 54 of flange 20 at weld sites 56 and 58, respectively. After being welded to the flange 20, the adapter tubes 16, 18 may be machined to define internal threads 60 (shown as a straight surface for ease of illustration) on an inner surface of the adapter tubes in first end regions 62 and 64 of the adapter tubes, adjacent flange 20. In the embodiment shown, threads 60 are located on a taped inner surface 61 of the adapter tubes. Threads 60 facilitate connection of draw and return lines (not shown) from the vehicle engine to the draw and return adapter tubes 16, 18.

Fuel tubes 12 and 14 may then be placed within a second end region 66, 68, respectively, of adapter tubes 16, 18. Fuel tubes 12 and 14 may define an outer diameter 70, 72, respectively, that may be slightly smaller than an inner diameter 74, 76, of second end regions 66, 68 of adapter tubes 16, 18, respectively, such that the fuel tubes 12, 14 are frictionally secured within their corresponding adapter tube. The fuel tubes may then be secured to the adapter tubes by welding at weld sites 78, 80, respectively. As shown in FIG. 2, tubes 12 and 14 only extend downwardly into adapter tubes 66 and 68 a distance such that an end of the fuel tubes 12 and 14 do not extend past the upper surface of raised lips 42 and 44, respectively. Accordingly, fuel tubes 12 and 14 are each positioned completely outwardly, i.e., away from flange 20, from the upper surfaces of raised lips 42 and 44 of flange 20.

Referring to fuel tube 12, for example, each of the fuel tubes may define a thickness 82 that may be consistent and/or uniform along a length 83 (see FIG. 1) of the fuel tube. In one embodiment, fuel tube 12 may be manufactured by the process of extrusion such that fuel tube 12 defines a uniform and consistent thickness 82, a uniform and consistent inner diameter 84, and a uniform and consistent outer diameter 70 along its length 83. Accordingly, other than first and second bends 12a and 12b, fuel tube 12 may not undergo further machining to be secured to flange 20. In other words, second end region 26 of fuel tube 12 may not need to be enlarged, reduced, or otherwise sized or shaped to be secured to aperture 38 of flange 20, even in cases where flange 20 is manufactured having only a single size aperture 38 that may be different than outer diameter 70 of fuel tube 12. Accordingly, a variety of different sized and shaped fuel tubes 12 may be secured to flange 20 by the use of adapter tube 16.

In particular, adapter tube 16 may be sized and shaped, having a thickness 86, an inner diameter 74 and, an outer diameter 88, that allows fuel tube 12 to be easily secured to the adapter tube 16, wherein the adapter tube 16 is secured to aperture 38 of flange 20. In this manner, fuel tube 12 (and 14) and flange 20, may all be manufactured in standard sizes, and the short adapter tubes 16, 18 may be sized to adjust for the different sizes of fuel tubes that may be secured to flange 20. In particular, adapter tube 16 may be manufactured having an outer diameter 88 that matches the size of aperture 38 and a thickness of the adapter tube such that the inner diameter 74 of the adapter tube matches an outer diameter of fuel tube 12. Accordingly, use of adapter tube 16 (and 18) allows different sizes of off-the-shelf, extruded fuel tubes 12 to be used with a single flange 20, without unduly machining or otherwise adjusting the size or shape of the fuel tubes.

Use of adapter tubes 16 may provide a thickness 86 of adapter tube material at flange 20 which may withstand the welding requirements of the manufacturing process of manufacturing assembly 10. In particular, flange 20 and/or fuel tube 12 may not be stressed or damaged by the welding process of welding fuel tube 12 to flange 20 because fuel tube 12 is welded to thick adapter tube 16, which is then welded to flange 20.

Use of adapter tubes 16 may also provide an assembly 10 that may withstand the stresses that assembly 10 may endure during bouncy and rocking movement of a vehicle along a highway. In particular, due to the length of tubes 12 extending into a fuel tank and away from flange 20, the first end 22 (see FIG. 1) of tubes 12 may bounce or rock during movement of a truck along a highway. This movement of first end 22 of tubes 12 may cause bending and shear stresses at the connection site of fuel tube 12 to flange 20, if the material at the connection site is too thin. Due to the thickness 86 of adapter tube 16, however, the adapter tube 16 may reduce or withstand such damage or stresses.

Use of adapter tubes 16 may also reduce the cost of manufacturing assembly 10. In particular, the mass of the material of adapter tubes 16, per unit length, may be as much as twenty percent more than the mass of material utilized to manufacture fuel tubes 12. Accordingly, the thick adapter tube 16 may only be utilized where such a thickness of material may help reduce stresses within the assembly, i.e., at flange 20, and wherein fuel tube 12 may have less mass along its length, where more mass may not be beneficial. In other words, a thick adapter tube is used at the weld site and at the shear stress site on flange 20, and a thin fuel tube is used along the length of fuel tube 12 where welding does not occur and where stress is not induced during welding or during operation of a vehicle.

Use of adapter tubes 16 may also allow threads 60 to be machined into adapter tube 16 without weakening or causing stress within first end region 62 of adapter tube 16 whereas such threads may cause stress within thin fuel tube 12 if such threads were created therein.

The process of manufacturing assembly 10 will now be described. Fuel tubes 12 and 14 are first manufactured in a desired predetermined size or diameter, such as by the process of extrusion. The fuel tubes 12 and 14 are then cut to their predetermined lengths. Fuel tubes 12 and 14 are then bent in first bend regions 12a, 14a, and in second bend regions 12b, 14b, to the desired predetermined angles 13, 15, respectively. Fuel return tube 14 is then crimped in first end region 24.

Adapter tubes 16 and 18 are then manufactured in a desired predetermined size or inner and outer diameter 74, 88, and thickness 86, such as by the process of extrusion. The adapter tubes 16 and 18 are then cut to their predetermined lengths, which may be substantially shorter than the length 83 of fuel tubes 12 and 14. Adapter tubes 16 and 18 may then be placed within their corresponding raised lip regions 42, 44, of apertures 38 and 40 of flange 20, and welded to the flange at weld sites 46 and 48. The adapter tubes may then further be welded to flange 20 at weld sites 56, 58 to define an airtight connection. The adapter tubes 16, 18 may then be machined to define inner threads 60 within a first end region 62, 64 of adapter tubes 16, 18, respectively.

Fuel tubes 12 and 14 may then be placed within second end regions 66, 68 of adapter tubes 16 and 18 and positioned such that bend regions 13 and 15 of the fuel tubes are positioned as desired. The fuel tubes 12 and 14 may then be welded to the adapter tubes 16 and 18, respectively, at weld sites 78, 80 to secure the tubes in place. The fuel tubes 12, 14 may then be secured together in first end regions 22, 24 by bracket 30.

Flange 20 may then be welded or otherwise secured to a surface of a fuel tank (not shown). The fuel tank may then be installed on a truck (not shown) and draw and return tube lines (not shown) connected to adapter tubes 16 and 18 at threads 60.

In the above description numerous details have been set forth in order to provide a more through understanding of the present invention. It will be obvious, however, to one skilled in the art that the present invention may be practiced using other equivalent designs.

We claim:

1. A draw and return tube fuel assembly, comprising:
a flange including a raised lip surrounding an aperture that extends through said flange, said raised lip including a smooth interior surface having an absence of a discontinuity therein and said raised lip including an upper surface positioned outwardly from a remainder of said flange;
an adapter tube secured to said flange and extending completely through said aperture and said raised lip, said adapter tube defining a smooth exterior surface having an absence of a discontinuity therein completely throughout a region of said adapter tube that extends through said aperture and said raised lip, and said adapter tube defining a smooth interior surface having an absence of a discontinuity therein completely throughout a region of said adapter tube through which a fuel tube is secured, said adapter tube extending from said flange outwardly from said upper surface of said raised lip to define a fuel tube connection region of said adapter tube positioned outwardly from said upper surface of said raised lip; and
said fuel tube having an end region including a uniform and consistent thickness, a uniform and consistent outer diameter completely throughout said end region, a smooth interior surface having an absence of a discontinuity therein, and a smooth exterior surface having an absence of a discontinuity therein, said end region of said fuel tube secured within said fuel tube connection region of said adapter tube such that said fuel tube is positioned completely outwardly of said upper surface of said raised lip of said flange and is completely positioned on the same side of said flange as the majority of said adapter tube, and wherein said outer diameter of said end region of said fuel tube is less than said inner diameter of said adapter tube.

2. The assembly of claim 1 wherein said fuel tube is extruded such that said uniform and consistent thickness and said uniform and consistent outer diameter of said end region of said fuel tube includes having an absence of threads therein.

3. The assembly of claim 1 wherein said adapter tube is extruded such that said smooth interior and exterior surfaces having an absence of a discontinuity therein includes having an absence of threads therein.

4. The assembly of claim 1 wherein said adapter tube is welded to said flange.

5. The assembly of claim 1 wherein said fuel tube is welded to said adapter tube.

6. The assembly of claim 1 wherein said thickness of a wall of said fuel tube is less than a thickness of a wall of said adapter tube.

7. The assembly of claim 1 wherein said fuel tube defines a mass of material per unit length at least twenty percent less than a mass of material per unit length of said adapter tube.

8. The assembly of claim 1 further comprising:
a second adapter tube secured to and extending completely through a second raised lip surrounding a second aperture that extends through said flange, said second adapter tube defining a smooth exterior surface having an absence of a discontinuity therein completely throughout a region of said second adapter tube that extends through said second aperture and said second raised lip, and said second adapter tube defining a smooth interior surface having an absence of a discontinuity therein completely throughout a region of said second adapter tube through which a second fuel tube is secured, and
said fuel tube having an end region including a uniform and consistent thickness, a uniform and consistent outer diameter completely throughout said end region, a smooth interior surface having an absence of a discontinuity therein, and a smooth exterior surface having an absence of a discontinuity therein, said end region of said fuel tube secured within said fuel tube connection region of said second adapter tube such that said fuel tube is positioned completely outwardly of an upper surface of said second raised lip of said flange, and wherein said outer diameter of said end region of said second fuel tube is less than said inner diameter of said second adapter tube, wherein said fuel tube comprises a fuel draw tube and said second fuel tube comprises a fuel return tube.

9. A method of manufacturing a draw and return tube assembly, comprising:
providing a flange including an aperture and a raised collar positioned around said aperture, said raised collar defining an upper surface positioned outwardly from a remainder of said flange;
placing an adapter tube completely through said raised collar of said flange, said adapter tube including a smooth exterior surface having an absence of a discontinuity therein completely along a length of a region of said adapter tube secured in the raised collar of said flange, and said adapter tube including a smooth interior surface having an absence of a discontinuity therein completely along a length of a region of said adapter tube having a fuel tube secured therein, said adapter tube extending from said flange outwardly from said upper surface of said raised collar to define a fuel tube connection region of said adapter tube positioned outwardly from said upper surface of said raised collar;
securing said adapter tube to said raised collar of said flange;
providing a fuel tube, said fuel tube including an end region having a uniform and consistent thickness, a uniform and consistent outer diameter completely along a length of said end region of said fuel tube secured within said adapter tube, a smooth interior surface having an absence of a discontinuity therein, and a smooth exterior surface having an absence of a discontinuity therein;
securing said end region of said fuel tube within said fuel tube connection region of said adapter tube such that said fuel tube is positioned completely outwardly of said upper surface of said raised collar of said flange and is completely positioned on the same side of said flange as the majority of said adapter tube, and wherein said outer diameter of said end region of said fuel tube is less than said inner diameter of said adapter tube.

10. The method of claim 9 wherein said outer diameter of said fuel tube is uniform and consistent along a complete length of said fuel tube.

11. The method of claim 9 wherein said fuel tube is extruded and wherein said uniform thickness of said fuel tube extends completely along its length.

12. The method of claim 9 wherein said securing an adapter tube comprises welding said adapter tube to said raised collar of said flange.

13. The method of claim 9 wherein a thickness of said adapter tube is greater than said thickness of said fuel tube.

14. The method of claim 9 wherein a thickness of said adapter tube is sufficient to withstand damage to said adapter tube during welding of said adapter tube to said raised collar of said flange.

15. A draw and return tube fuel apparatus, comprising:
a base including a first outwardly extending structure that surrounds a first aperture extending through said base, said first outwardly extending structure defining a first upper surface, and a second outwardly extending structure that surrounds a second aperture extending through said base, said second outwardly extending structure defining a second upper surface;
a first adapter tube secured to and extending completely through said first outwardly extending structure and said first aperture of said base, said first adapter tube defining a first fuel tube connection region positioned completely outwardly of said first upper surface;
a second adapter tube secured to and extending completely through said second outwardly extending structure and said second aperture of said base, said second adapter tube defining a second fuel tube connection region positioned completely outwardly of said second upper surface;
a first extruded fuel tube secured within said first fuel tube connection region of said first adapter tube, completely outwardly of said first upper surface and completely positioned on the same side of said base as the majority of said first adapter tube, and having an outer diameter less than an inner diameter of said first adapter tube; and
a second extruded fuel tube secured within said second fuel tube connection region of said second adapter tube, completely outwardly of said second upper surface and completely positioned on the same side of said base as the majority of said second adapter tube, and having an outer diameter less than an inner diameter of said second adapter tube,
wherein a region of each of said first and said second extruded adapter tubes that extends through said outwardly extending structures each includes a smooth exterior surface having an absence of a discontinuity therein completely along a length of said region and wherein said fuel connection region of each of said first and said second adapter tubes having said fuel tube secured therein includes a smooth interior surface having an absence of a discontinuity therein completely along a length of said fuel connection region.

16. The apparatus of claim 15 wherein a thickness of each of said first and second adapter tubes is each greater than a thickness of a corresponding fuel tube secured thereto.

17. The apparatus of claim 15 wherein said first and second adapter tubes are each secured to said base by airtight welds extending around each of said adapter tube.

18. The apparatus of claim 15 wherein an entirety of said first and second fuel tubes are each positioned completely outwardly of said upper surface of a corresponding outwardly extending structure.

19. The apparatus of claim 1 wherein said fuel tube connection region of said adapter tube is positioned completely outwardly from said upper surface of said raised lip and wherein said fuel tube is positioned completely outwardly of said upper surface of said raised lip of said flange.

20. The method of claim 9 wherein said fuel tube connection region of said adapter tube is positioned completely outwardly from said upper surface of said raised collar and wherein said fuel tube is positioned completely outwardly of said upper surface of said raised collar of said flange.

* * * * *